United States Patent
Chen

(10) Patent No.: US 10,499,032 B2
(45) Date of Patent: Dec. 3, 2019

(54) NAKED-EYE STEREOSCOPIC DISPLAY AND METHOD OF DISPLAYING A STEREOSCOPIC IMAGE

(71) Applicant: Au Optronics Corporation, Hsinchu (TW)

(72) Inventor: Ya-Ting Chen, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 0 days.

(21) Appl. No.: 15/964,073

(22) Filed: Apr. 27, 2018

(65) Prior Publication Data

US 2019/0230333 A1 Jul. 25, 2019

(30) Foreign Application Priority Data

Jan. 24, 2018 (TW) .............................. 107102535 A

(51) Int. Cl.
| | |
|---|---|
| H04N 13/128 | (2018.01) |
| H04N 13/395 | (2018.01) |
| G02F 1/29 | (2006.01) |
| G02F 1/13 | (2006.01) |
| G02F 1/1335 | (2006.01) |
| G02B 27/22 | (2018.01) |
| G02F 1/1333 | (2006.01) |
| G02F 1/1347 | (2006.01) |

(52) U.S. Cl.
CPC ....... *H04N 13/128* (2018.05); *G02B 27/2278* (2013.01); *G02F 1/1347* (2013.01); *G02F 1/133345* (2013.01); *G02F 1/133526* (2013.01); *G02F 1/133528* (2013.01); *G02F 1/29* (2013.01); *H04N 13/395* (2018.05); *H04N 2213/001* (2013.01)

(58) Field of Classification Search
None
See application file for complete search history.

(56) References Cited

U.S. PATENT DOCUMENTS

| | | | |
|---|---|---|---|
| 8,259,242 B2 | 9/2012 | Chang et al. | |
| 9,881,529 B2 | 1/2018 | Sumi | |
| 2005/0073471 A1* | 4/2005 | Selbrede | G02F 1/1347 345/4 |
| 2010/0066654 A1 | 3/2010 | Huang et al. | |

(Continued)

FOREIGN PATENT DOCUMENTS

| | | |
|---|---|---|
| CN | 103185985 | 7/2013 |
| CN | 107357047 | 11/2017 |

(Continued)

*Primary Examiner* — Reza Aghevli
(74) *Attorney, Agent, or Firm* — JCIPRNET

(57) ABSTRACT

A naked-eye stereoscopic display adapted to provide a stereoscopic image is provided. The naked-eye stereoscopic display includes a first display panel, a second display panel, and an image-depth adjusting device. The second display panel is disposed on the first display panel. The image-depth adjusting device is disposed between the first display panel and the second display panel. The image-depth adjusting device includes a transparent insulation layer and a liquid crystal layer. A material of the transparent insulation layer includes glass or plastic, and a thickness of the transparent insulation layer is 0.5 cm to 10 cm. A stereoscopic image display method is also provided.

15 Claims, 5 Drawing Sheets

(56) References Cited

U.S. PATENT DOCUMENTS

| | | | |
|---|---|---|---|
| 2010/0302468 A1* | 12/2010 | Lin | G02F 1/1347 |
| | | | 349/15 |
| 2011/0176073 A1 | 7/2011 | Chang et al. | |
| 2012/0188637 A1* | 7/2012 | Joseph | G02B 27/2278 |
| | | | 359/478 |
| 2013/0334543 A1* | 12/2013 | Kim | H01L 33/36 |
| | | | 257/79 |
| 2014/0192281 A1* | 7/2014 | Smithwick | G02F 1/1313 |
| | | | 349/15 |
| 2016/0202758 A1* | 7/2016 | Peana | G06F 3/013 |
| | | | 345/601 |
| 2016/0330435 A1* | 11/2016 | Yamaichi | G02B 27/2278 |
| 2016/0364836 A1 | 12/2016 | Sumi | |
| 2018/0132371 A1* | 5/2018 | Yeum | G02F 1/133305 |
| 2018/0313977 A1* | 11/2018 | Newton | G02B 1/11 |

FOREIGN PATENT DOCUMENTS

| | | |
|---|---|---|
| TW | 201126203 | 8/2011 |
| TW | 201643515 | 12/2016 |

* cited by examiner

NAKED-EYE STEREOSCOPIC DISPLAY AND METHOD OF DISPLAYING A STEREOSCOPIC IMAGE

CROSS-REFERENCE TO RELATED APPLICATION

This application claims the priority benefit of Taiwan application serial no. 107102535, filed on Jan. 24, 2018. The entirety of the above-mentioned patent application is hereby incorporated by reference herein and made a part of this specification.

BACKGROUND

Technical Field

The disclosure relates to a display device and a display method; more particularly, the disclosure relates to a naked-eye stereoscopic display and a method of displaying a stereoscopic image.

Description of Related Art

In recent years, continuous advancement of display technologies results in increasing demands on display quality of displays, such as image resolution, color saturation, and so on. Nevertheless, when a user intends to purchase a display, whether the display is able to display stereoscopic images or not is also taken into consideration in addition to high image resolution and high color saturation.

The current stereoscopic image display technologies may be categorized into a stereoscopic image display technology that requires the user to wear a specially-designed pair of glasses and a naked-eye or auto-stereoscopic image display technology. The former has been matured and widely applied for special uses, such as military simulation and large-scale entertainment. However, the stereoscopic display technology that requires the glasses cannot be easily popularized due to lack of convenience and comfort. Hence, the naked-eye stereoscopic image display technology has been gradually developed and become a new trend.

The normal naked-eye stereoscopic display technology can at least be divided into a two-dimensional (2D) multiplexed technology, a volumetric technology, and a holographic technology according to different principles of operation. According to the 2D multiplexed technology, spatial multiplexing (parallax barrier, lenticular lens array) or time multiplexing is applied to generate a left-eye image and a right-eye image, such that the images received by the left eye and the right eye are different, and a stereoscopic image which creates an illusion of depth can then be generated after the brain processes these images. This technology, however, may easily lead to the reduction of the image resolution of the display. According to the volumetric technology, a laser light source projects a laser beam from the bottom to a rapidly rotated circular plate, and the stereoscopic image may be constructed by the scattering effects generated by a surface receiving the projected laser beam. However, the rotation speed at different locations spaced from the axis by different distances may vary, which results in blur stereoscopic images and reduces the image quality. According to the holographic technology, red, green, and blue laser beams pass through an acousto-optic modulator to generate information of phase gratings, and such information is irradiated to a hologram by a scanning mirror, so as to display the stereoscopic image recorded by the hologram. However, this technology is complicated, difficult, and costly; besides, since the image information has to be recorded by the hologram in advance, the stereoscopic image cannot be immediately displayed. What is more, the size of the image is also subject to a size of the acousto-optic modulation crystal grain, which harms the utility of the holographic technology.

The aforesaid naked-eye stereoscopic display is mostly used for complicated and difficult optical structural design or image processing, and it is rather difficult to utilize the display on commercial products. At present, the most feasible 2D multiplexed technology is the most popular naked-eye stereoscopic display technology; nevertheless, in this case, the image resolution is often sacrificed for stereoscopic perception, thus deteriorating the image quality. Therefore, how to develop a naked-eye stereoscopic display that may ensure the image resolution and quality, prevent optical interference, and have feasibility and competitiveness has become a goal that people skilled in the pertinent art are endeavored to achieve.

SUMMARY

The disclosure provides a naked-eye stereoscopic display and a method of displaying a stereoscopic image, whereby optical interference may be avoided and image resolution and quality may remain satisfactory. Besides, the structure of the display and the imaging principle are simple.

In an embodiment of the invention, a naked-eye stereoscopic display adapted to provide a stereoscopic image is provided. The naked-eye stereoscopic display includes a first display panel, a second display panel, and an image-depth adjusting device. The second display panel is disposed on the first display panel. The image-depth adjusting device is disposed between the first display panel and the second display panel. The image-depth adjusting device includes a transparent insulation layer and a liquid crystal layer. A material of the transparent insulation layer includes materials such as glass or plastic, and a thickness of the transparent insulation layer is 0.5 cm to 10 cm.

In another embodiment of the invention, a method of displaying a stereoscopic image is provided, and the method includes following steps. The naked-eye stereoscopic display is provided. First image-depth information and second image-depth information are provided according to an image-depth threshold. First image information and second image information are provided according to the first image-depth information and the second image-depth information. A first image is provided by the first display panel according to the first image information, wherein an image-depth value of the first image is greater than the image-depth threshold. A second image is provided by the second display panel according to the second image information, wherein an image-depth value of the second image is less than the image-depth threshold, and the first image and the second image constitute the stereoscopic image.

In view of the above, the naked-eye stereoscopic display provided herein may generate a stereoscopic image with high resolution and quality through the stacked design of the first display panel, the second display panel, and the image-depth adjusting device.

According to one or more embodiments of the invention, a voltage may be applied to the image-depth adjusting device to finely adjust the location of a focus plane of the stereoscopic image.

According to one or more embodiments of the invention, a pitch between two adjacent first adjusting electrodes of the image-depth adjusting device may be shorter than or equal to a pitch between two adjacent sub-pixels of the first display panel, so as to modify the light pattern distribution of the first image, eliminate optical interference, sharpen the image, and improve the image quality.

According to one or more embodiments of the invention, the image-depth adjusting device may adjust a physical image-depth location of the first image according to the image-depth index, so as to improve the quality of the stereoscopic image.

To make the above features and advantages provided in one or more of the embodiments of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein

DESCRIPTION OF THE EMBODIMENTS

Figure 1:
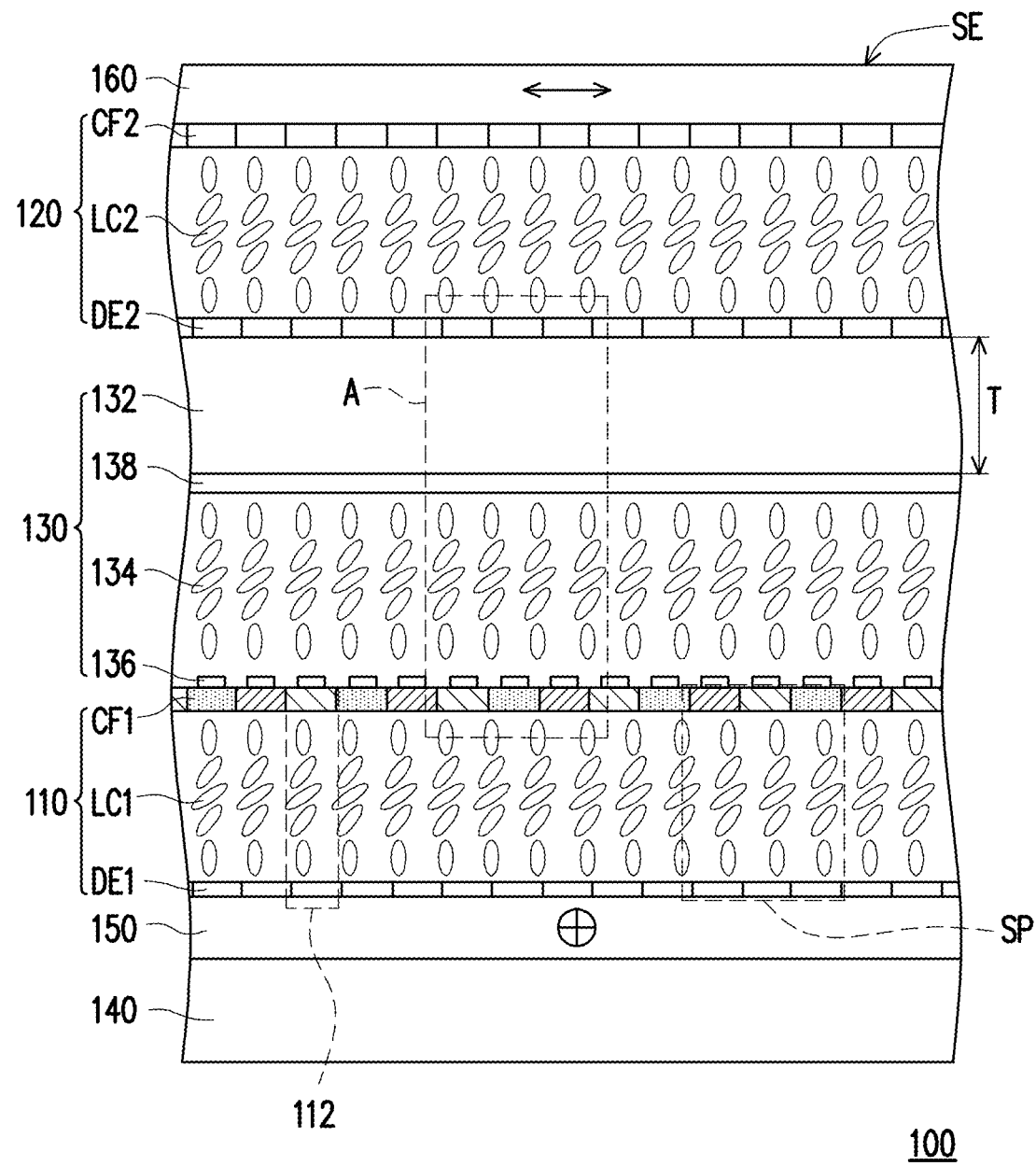
FIG. 1 is a schematic cross-sectional view of a naked-eye stereoscopic display according to an embodiment of the invention.
Figure 2:
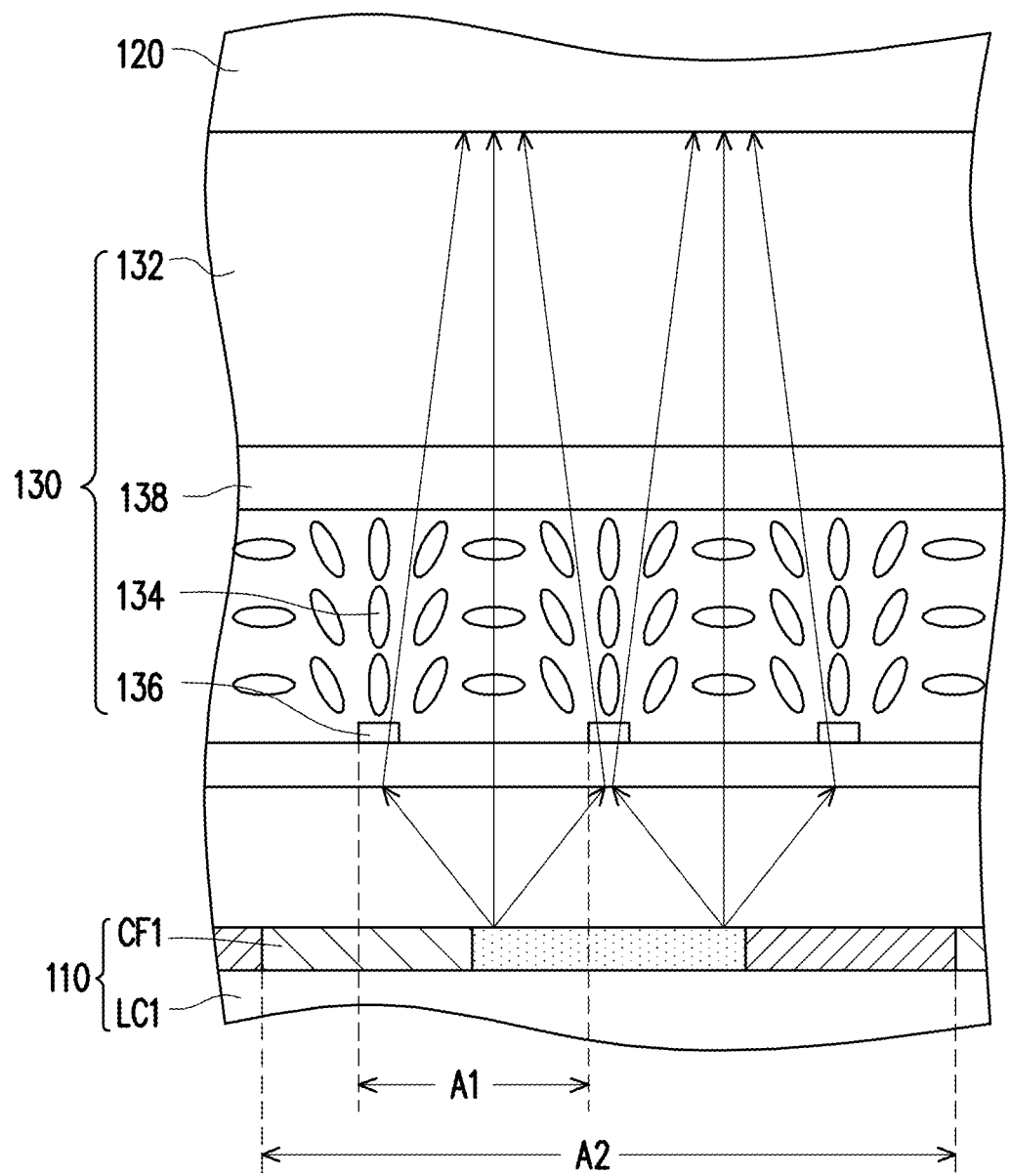
FIG. 2 is a schematic enlarged view of a region A of the naked-eye stereoscopic display depicted in FIG. 1.
Figure 3:
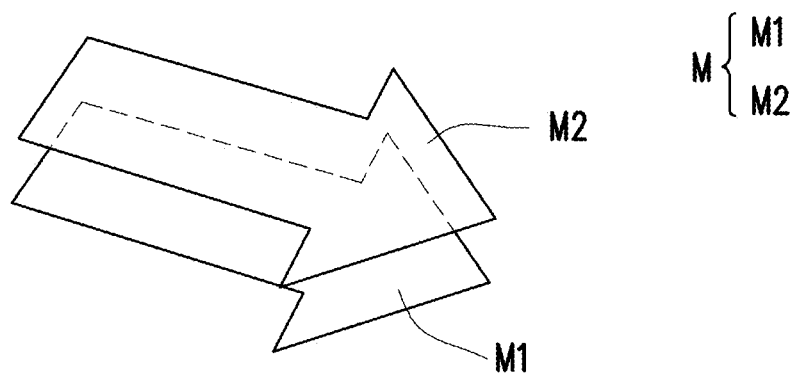
FIG. 3 is a schematic view of a stereoscopic image provided by the naked-eye stereoscopic display depicted in FIG. 1.

FIG. 1 is a schematic cross-sectional view of a naked-eye stereoscopic display according to an embodiment of the invention. FIG. 2 is a schematic enlarged view of a region A of the naked-eye stereoscopic display depicted in FIG. 1. FIG. 3 is a schematic view of a stereoscopic image provided by the naked-eye stereoscopic display depicted in FIG. 1. With reference to FIG. 1 to FIG. 3, a naked-eye stereoscopic display 100 includes a first display panel 110, a second display panel 120, and an image-depth adjusting device 130. The second display panel 120 is disposed on the first display panel 110. The image-depth adjusting device 130 is disposed between the first display panel 110 and the second display panel 120. The naked-eye stereoscopic display 100 is, for instance, constituted by a two-layer liquid crystal display (LCD) panel and provides a stereoscopic image M from the light-exiting surface S (as shown in FIG. 3). The first display panel 110 is adapted to provide a first image M1, and the second display panel 120 is adapted to provide a second image M2. The first image M1 and the second image M2 constitute the stereoscopic image M.

Each of the first display panel 110 and the second display panel 120 includes a plurality of display pixels SP arranged in an array, and each display pixel SP is exemplified as including three sub-pixels (as shown by the sub-pixels 112 of the first display panel 110 in FIG. 1). The first display panel 110 includes a first color filter structure CF1, a first display medium LC1, and a first electrode DE1, wherein the first display medium LC1 is located between the first color filter structure CF1 and the first electrode DE1. The second display panel 120 includes a second color filter structure CF2, a second display medium LC2, and a second electrode DE2, wherein the second display medium LC2 is located between the second color filter structure CF2 and the second electrode DE2.

The first display medium LC1 and the second display medium LC2 may include liquid crystal molecules or other appropriate media. The first display medium LC1 and the second display medium LC2 provided in the following embodiments are the liquid crystal molecules, for instance, which should however not be construed as a limitation in the disclosure. Besides, the liquid crystal molecules provided in the following embodiments may preferably be rotated or switched by a horizontal electric field or by a vertical electrical field, for instance; however, the disclosure is not limited thereto. In other words, according to the present embodiment, the first display panel 110 and the second display panel 120 are the LCD panels.

In the present embodiment, the first color filter structure CF1 and the second color filter structure CF2 are color filters constituted by sequentially and repeatedly arranged red filter patterns, green filter patterns, and blue filter patterns, for instance. Besides, in the present embodiment, each of the first color filter structure CF1 and the second color filter structure CF2 may respectively include electrodes (not shown), so as to respectively generate electric fields with the first electrode DE1 and the second electrode DE2 for regulating the first display medium LC1 and the second display medium LC2. However, in some examples, the first and second display panels 110 and 120 may be merely equipped with the electrodes (i.e., the first and second electrodes DE1 and DE2) on one side, and the first and second color filter structures CF1 and CF2 do not include any electrode, which should not be construed as limitations in the disclosure.

The image-depth adjusting device 130 includes a transparent insulation layer 132 and a liquid crystal layer 134. In the present embodiment, a material of the transparent insulation layer 132 includes materials such as glass or plastic, and a thickness T of the transparent insulation layer 132 is 0.5 cm to 10 cm (the desired stereoscopic image depth is determined by the actual products), which should not be construed as limitations in the disclosure. Thereby, the first image M1 and the second image M2 are respectively displayed at different image-depth locations to generate the stereoscopic image M, and thereby a user may simultaneously receive different image-depth information which renders the stereoscopic visual effects.

The liquid crystal layer 134 is located between the transparent insulation layer 132 and the first display panel 110. The image-depth adjusting device 130 further includes a plurality of first adjusting electrodes 136 and a second adjusting electrode 138, and the liquid crystal layer 134 is located between the first adjusting electrodes 136 and the second adjusting electrode 138. An electric field may thereby be generated by the first adjusting electrodes 136 and the second adjusting electrode 138, so as to adjust the liquid crystal layer 134. As such, the location of a focus plane of the stereoscopic image M may be finely adjusted through an add-on voltage, and the user may be able to adjust the image-depth perception according to actual requirements.

Figure 4A:
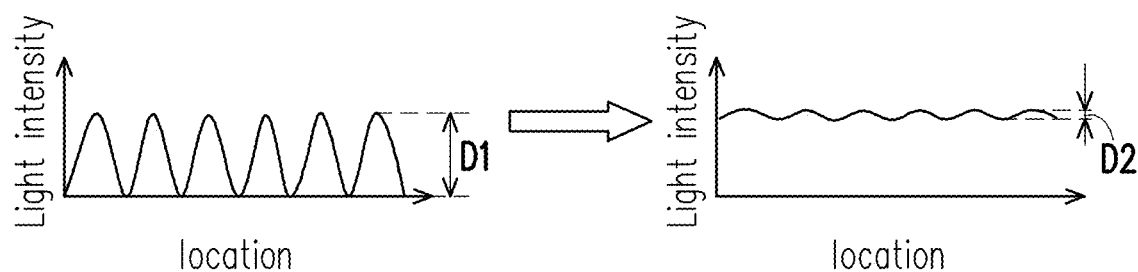
FIG. 4A is a diagram illustrating light pattern distribution before and after the first display panel depicted in FIG. 1 is adjusted by the image-depth adjusting device.
Figure 4B:
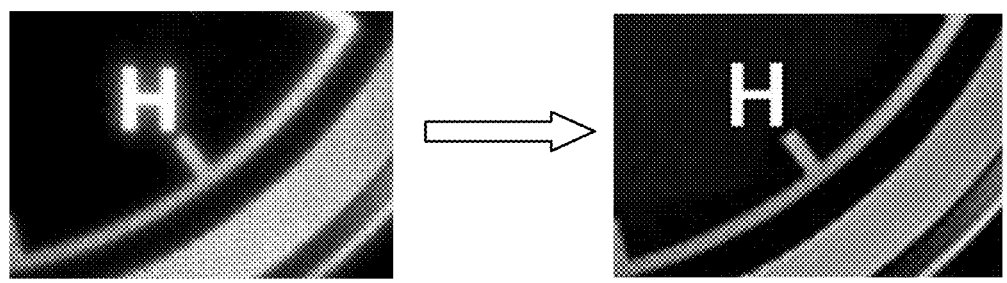
FIG. 4B is a schematic view of images before and after the first display panel depicted in FIG. 1 is adjusted by the image-depth adjusting device.

FIG. 4A is a diagram illustrating light pattern distribution before and after the first display panel depicted in FIG. 1 is adjusted by the image-depth adjusting device, and FIG. 4B is a schematic view of images before and after the first display panel depicted in FIG. 1 is adjusted by the image-depth adjusting device. With reference to FIG. 2, FIG. 4A, and FIG. 4B, in the present embodiment, a pitch A1 between two adjacent first adjusting electrodes 136 in the image-depth adjusting device 130 is shorter than or equal to a pitch A2 between two adjacent sub-pixels 112 in the first display panel 110. Hence, the arrangement of the liquid crystal molecules in the corresponding regions of the liquid crystal layer 134 may be controlled by each of the first adjusting electrodes 136 in a one-on-one manner, so as to further control the light patterns of the image beams transmitted through the liquid crystal molecules in each region of each sub-pixel 112. Thereby, the light pattern distribution of the first image M1 provided by the first display panel 110 may be further modified, so as to further eliminate optical interference, sharpen the image, and improve the image quality. With reference to FIG. 3 and FIG. 4A, in the present embodiment, a first light beam of the first image M1 becomes a second light beam after passing through the liquid crystal layer 134 of the image-depth adjusting device 130, a brightness variation of a light pattern distribution of the first light beam is D1, a brightness variation of a light pattern distribution of the second light beam is D2, and D2/D1<1/2.

In other words, the thickness of the transparent insulation layer 132 may determine the difference between the physical image depths of the first image M1 and the second image M2. The location of a focus plane of the stereoscopic image M may be finely adjusted by the liquid crystal layer 134 through an add-on voltage, and the user may be able to adjust the image-depth perception according to actual requirements. At the same time, the liquid crystal layer 134 may control the light pattern distribution of the light beam emitted by the first display panel, so as to prevent optical interference (e.g., Moiré pattern).

In this embodiment, the naked-eye stereoscopic display 100 may further include a backlight 140, a first polarizer 150, and a second polarizer 160. The first polarizer 150 is disposed between the first display panel 110 and the backlight 140. The second polarizer 160 is disposed on an outer surface of the second display panel 120. The polarizing direction of the first polarizer 150 is orthogonal to the polarizing direction of the second polarizer 160.

Figure 5:
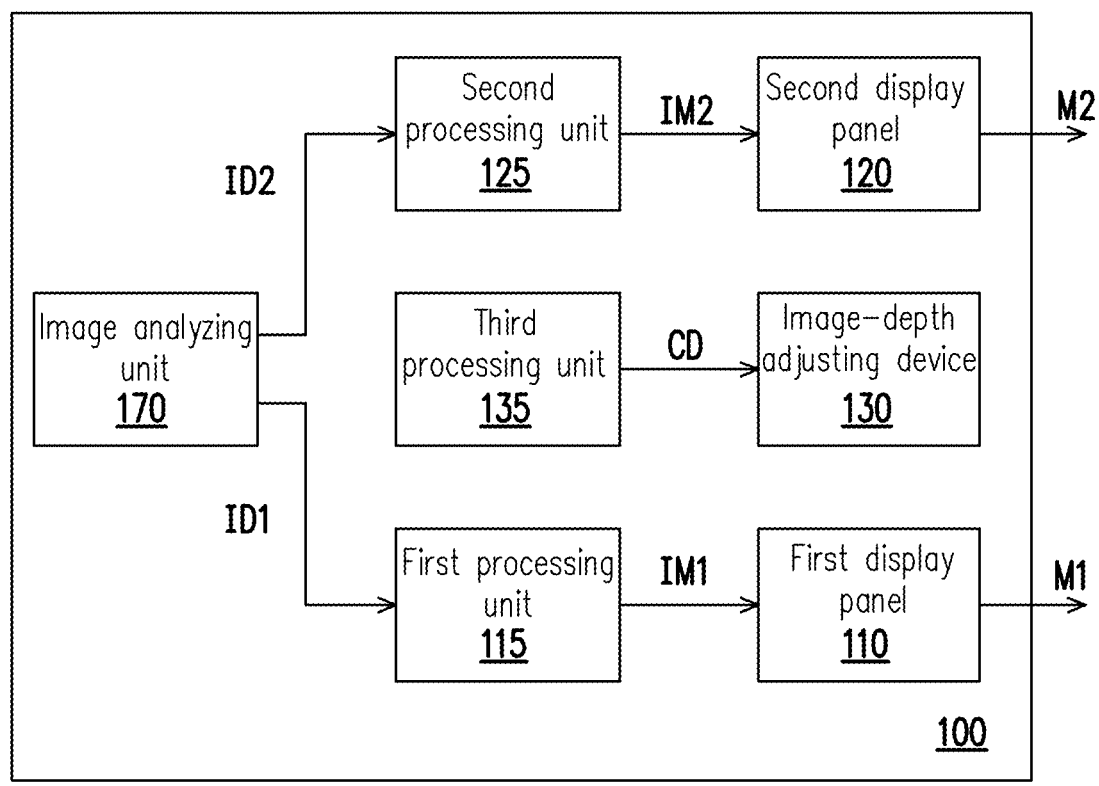
FIG. 5 is a block diagram of the naked-eye stereoscopic display depicted in FIG. 1.

FIG. 5 is a block diagram of the naked-eye stereoscopic display depicted in FIG. 1. With reference to FIG. 1 and FIG. 5, a naked-eye stereoscopic display 100 further includes a first processing unit 115, a second processing unit 125, and a third processing unit 135. The first processing unit 115 is electrically connected to the first display panel 110. The second processing unit 125 is electrically connected to the second display panel 120. The third processing unit 135 is electrically connected to the image-depth adjusting device 130. The first processing unit 115 is adapted to provide first image information IM1 to the first display panel 110, so as to allow the first display panel 110 to generate and provide a first image M1 according to the first image information IM1. The second processing unit 125 is adapted to provide second image information IM2 to the second display panel 120, so as to allow the second display panel 120 to generate and provide a second image M2 according to the second image information IM2. The third processing unit 135 is adapted to provide an image-depth index CD to the image-depth adjusting device 130, so that a user is able to have different image-depth perceptions of the stereoscopic image M according to different use scenarios.

In the present embodiment, the naked-eye stereoscopic display 100 further includes an image analyzing unit 170. The image analyzing unit 170 processes image signals according to an image-depth threshold, so as to provide first image-depth information ID1 to the first processing unit 115 and provide second image-depth information ID2 to the second processing unit 125. Hence, the first processing unit 115 and the second processing unit 125 may respectively convert the first image-depth information ID1 and the second image-depth information ID2 into 2D planar images.

The image analyzing unit 170 may perform an image-depth analysis on an original stereoscopic image, digitize the analyzed result, and obtain the first image-depth information ID1 and the second image-depth information ID2 according to the numeral value of the image-depth threshold. For instance, the range of the image-depth value of the original stereoscopic image is 0 to T, and the image-depth threshold is T/2, for instance. The image analyzing unit 170 converts one portion of image information with the image-depth value from 0 to T/2 in the original stereoscopic image into the first image-depth information ID1 and converts the other portion of image information with the image-depth value from T/2 to T in the original stereoscopic image into the second image-depth information ID2. In other embodiments, the image-depth threshold may be set or adjusted according to the user's needs or changes to the use scenarios, which should not be construed as a limitation in the disclosure.

The first processing unit 115 provides the first image information IM1 including 2D image information to the first display panel 110 according to the first image-depth information ID1. The second processing unit 125 provides the second image information IM2 including 2D image information to the second display panel 120 according to the second image-depth information ID2. After that, the first display panel 110 performs image representation (i.e., provide the first image M1) according to the first image information IM1 provided by the first processing unit 115, and the second display panel 120 performs image representation (i.e., provide the second image M2) according to the second image information IM2 provided by the second processing unit 125. As such, the user is able to receive the stereoscopic image M generated by the first image M1 and the second image M2 with different image depths and perceive the stereoscope image.

Figure 6:
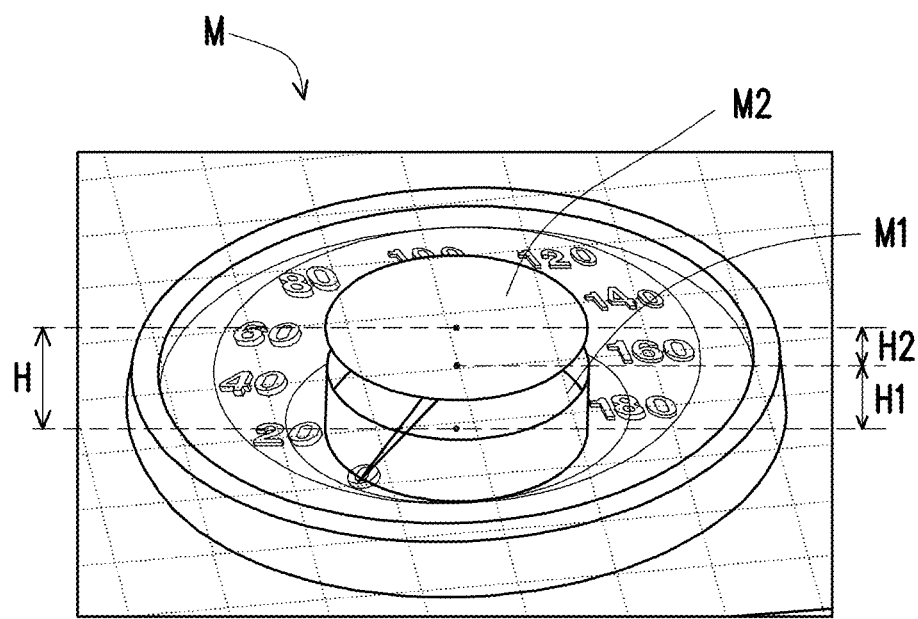
FIG. 6 is a schematic view of another stereoscopic image provided by the naked-eye stereoscopic display depicted in FIG. 1.

FIG. 6 is a schematic view of another stereoscopic image provided by the naked-eye stereoscopic display depicted in FIG. 1. With reference to FIG. 1, FIG. 5, and FIG. 6, in the method of displaying the stereoscopic image provided in the present embodiment, provide the naked-eye stereoscopic display 100 as shown in FIG. 1. Provide first image-depth information ID1 and second image-depth information ID2 according to an image-depth threshold. In the present embodiment, the image analyzing unit 170 performs an analysis on image depth of the original stereoscopic image, converts the original stereoscopic image with an image-depth value between the image-depth threshold and a total image depth H of the original stereoscopic image into the first image-depth information ID1 according to the image-depth threshold, and converts the original stereoscopic image with an image-depth value between 0 and the image-depth threshold into the second image-depth information ID2.

Then, provide first image information IM1 and second image information IM2 according to the first image-depth information ID1 and the second image-depth information ID2, respectively. Provide the first image information IM1 to the first display panel 110 by the first processing unit 115 according to the first image-depth information ID1. Provide the second image information IM2 to the second display panel 120 by the second processing unit 125 according to the second image-depth information ID2. Provide a first image M1 by the first display panel 110 according to the first image information IM1, wherein an image-depth value of the first image M1 is greater than the image-depth threshold. Besides, provide a second image M2 by the second display panel 120 according to the second image information IM2, wherein an image-depth value of the second image M2 is less than the image-depth threshold, and the first image M1 and the second image M2 constitute the stereoscopic image M. In other words, the image displayed by the first image M1 is the image corresponding to the original stereoscopic image with the image-depth value between the image-depth threshold and the total image depth H (i.e., the maximum image depth), the second image M2 is the image corresponding to the original stereoscopic image with the image-depth value between 0 and the image-depth threshold, and the sum of the image depth H1 corresponding to the first image M1 and the image depth H2 corresponding to the second image M2 is the total image depth H of the original stereoscopic image.

In addition to the aforesaid steps in the method of displaying the stereoscopic image, according to the present embodiment, an image-depth index CD may be provided by the third processing unit 135 in the naked-eye stereoscopic display 100 according to a predetermined scenario, and the image-depth adjusting device 130 adjusts a physical image-depth location of the first image M1 of the first display panel 110 according to the image-depth index CD. Thereby, the image depth perception of the user resulting from the first image M1 may be further adjusted according to the user's needs or the change of the use scenarios, so as to improve the image quality of the stereoscopic image.

To sum up, the naked-eye stereoscopic display provided herein may generate the stereoscopic image with high resolution and quality through the stacked design of the first display panel, the second display panel, and the image-depth adjusting device. Hence, a voltage may be applied to the image-depth adjusting device to finely adjust the location of the focus plane of the stereoscopic image. Besides, the pitch between two adjacent first adjusting electrodes of the image-depth adjusting device may be shorter than or equal to the pitch between two adjacent sub-pixels of the first display panel, so as to modify the light pattern distribution of the first image, eliminate the optical interference, sharpen the image, and improve the image quality. In another aspect, the image-depth adjusting device may adjust the physical image-depth location of the first image according to the image-depth index, so as to improve the quality of the stereoscopic image.

It will be apparent to those skilled in the art that various modifications and variations can be made to the structure described in the disclosure without departing from the scope or spirit of the disclosure. In view of the foregoing, it is intended that the disclosure cover modifications and variations provided they fall within the scope of the following claims and their equivalents.

What is claimed is:

1. A naked-eye stereoscopic display adapted to provide a stereoscopic image and comprising:
    a first display panel;
    a second display panel disposed on the first display panel; and
    an image-depth adjusting device disposed between the first display panel and the second display panel and comprising a transparent insulation layer and a liquid crystal layer, a material of the image-depth adjusting device comprising glass or plastic, a thickness of the transparent insulation layer being 0.5 cm to 10 cm, wherein the image-depth adjusting device is overlapped with the first display panel and the second display panel along a normal direction of the first display panel.

2. The naked-eye stereoscopic display as recited in claim 1, wherein the liquid crystal layer is located between the transparent insulation layer and the first display panel, the image-depth adjusting device further comprises a plurality of first adjusting electrodes, the first display panel comprises a plurality of sub-pixels, and a pitch between two adjacent ones of the first adjusting electrodes is shorter than or equal to two adjacent ones of the sub-pixels.

3. The naked-eye stereoscopic display as recited in claim 2, wherein the image-depth adjusting device further comprises a second adjusting electrode, and the liquid crystal layer is located between the first adjusting electrodes and the second adjusting electrode.

4. The naked-eye stereoscopic display as recited in claim 3, further comprising:
    a backlight;
    a first polarizer disposed between the first display panel and the backlight; and
    a second polarizer, wherein the second display panel is disposed between the second polarizer and the first display panel, and each of the first display panel and the second display panel is a liquid crystal display panel.

5. The naked-eye stereoscopic display as recited in claim 1, further comprising:
    a first processor electrically connected to the first display panel;
    a second processor electrically connected to the second display panel; and
    a third processor electrically connected to the image-depth adjusting device.

6. The naked-eye stereoscopic display as recited in claim 5, further comprising:
    an image analyzer processing an input image signal according to an image-depth threshold, providing first image-depth information to the first processor, and providing second image-depth information to the second processor, the first processor and the second processor respectively converting the first image-depth information and the second image-depth information to first image information and second image information, the first display panel providing a first image according to the first image information, the second display panel providing a second image according to the second image information.

7. A method of displaying a stereoscopic image, comprising:
    providing the naked-eye stereoscopic display as recited in claim 1;
    providing first image-depth information and second image-depth information according to an image-depth threshold;

providing first image information and second image information according to the first image-depth information and the second image-depth information;

providing a first image by the first display panel according to the first image information, wherein an image-depth value of the first image is greater than the image-depth threshold; and providing a second image by the second display panel according to the second image information, wherein an image-depth value of the second image is less than the image-depth threshold, and the first image and the second image constitute the stereoscopic image.

8. The method of displaying the stereoscopic image as recited in claim 7, wherein a first light beam of the first image becomes a second light beam after passing through the liquid crystal layer of the image-depth adjusting device, a brightness variation of a light pattern distribution of the first light beam is D1, a brightness variation of a light pattern distribution of the second light beam is D2, and D2/D1<1/2.

9. The method of displaying the stereoscopic image as recited in claim 8, wherein the naked-eye stereoscopic display further comprises:
a first processor electrically connected to the first display panel;
a second processor electrically connected to the second display panel; and
a third processor electrically connected to the image-depth adjusting device, the method further comprising:
providing an image-depth index by the third processor according to a predetermined scenario; and
adjusting a physical image-depth location of the first image of the first display panel by the image-depth adjusting device according to the image-depth index.

10. A naked-eye stereoscopic display adapted to provide a stereoscopic image and comprising:
a first display panel;
a second display panel disposed on the first display panel;
an image-depth adjusting device disposed between the first display panel and the second display panel and comprising a transparent insulation layer and a liquid crystal layer, a material of the image-depth adjusting device comprising glass or plastic, a thickness of the transparent insulation layer being 0.5 cm to 10 cm, wherein the image-depth adjusting device is overlapped with the first display panel and the second display panel along a normal direction of the first display panel; and
a backlight, wherein the first display panel is disposed between the backlight and the image-depth adjusting device, and wherein the liquid crystal layer is disposed between the backlight and transparent insulation layer.

11. The naked-eye stereoscopic display as recited in claim 10, wherein the liquid crystal layer is located between the transparent insulation layer and the first display panel, the image-depth adjusting device further comprises a plurality of first adjusting electrodes, the first display panel comprises a plurality of sub-pixels, and a pitch between two adjacent ones of the first adjusting electrodes is shorter than or equal to two adjacent ones of the sub-pixels.

12. The naked-eye stereoscopic display as recited in claim 11, wherein the image-depth adjusting device further comprises a second adjusting electrode, and the liquid crystal layer is located between the first adjusting electrodes and the second adjusting electrode.

13. The naked-eye stereoscopic display as recited in claim 12, further comprising:
a first polarizer disposed between the first display panel and the backlight; and
a second polarizer, wherein the second display panel is disposed between the second polarizer and the first display panel, and each of the first display panel and the second display panel is a liquid crystal display panel.

14. The naked-eye stereoscopic display as recited in claim 10, further comprising:
a first processor electrically connected to the first display panel;
a second processor electrically connected to the second display panel; and
a third processor electrically connected to the image-depth adjusting device.

15. The naked-eye stereoscopic display as recited in claim 14, further comprising:
an image analyzer processing an input image signal according to an image-depth threshold, providing first image-depth information to the first processor, and providing second image-depth information to the second processor, the first processor and the second processor respectively converting the first image-depth information and the second image-depth information to first image information and second image information, the first display panel providing a first image according to the first image information, the second display panel providing a second image according to the second image information.

* * * * *